United States Patent [19]

Stöckle et al.

[11] Patent Number: 4,492,908
[45] Date of Patent: Jan. 8, 1985

[54] APPARATUS FOR SYNCHRONIZING THE SLATS OF MOTOR DRIVEN WINDOW BLINDS

[75] Inventors: Bernd Stöckle; Klaus Pfendler, both of Bonndorf, Fed. Rep. of Germany

[73] Assignee: International Standard Electric Corporation, New York, N.Y.

[21] Appl. No.: 467,521

[22] Filed: Feb. 17, 1983

[30] Foreign Application Priority Data

Feb. 19, 1982 [DE] Fed. Rep. of Germany ....... 3206002

[51] Int. Cl.³ .............................................. C05B 1/06
[52] U.S. Cl. .................................. 318/663; 318/640; 318/678; 160/DIG. 17; 160/166 R
[58] Field of Search ....................... 318/663, 640, 678; 160/DIG. 17, 166

[56] References Cited

U.S. PATENT DOCUMENTS

| | | | |
|---|---|---|---|
| 2,149,481 | 3/1939 | Bosch et al. | 160/DIG. 17 |
| 3,249,148 | 3/1966 | Zablodil | 160/DIG. 17 |
| 3,559,024 | 1/1971 | Marder | 160/DIG. 17 |
| 3,742,327 | 6/1973 | Nettles | 318/678 |
| 3,890,550 | 6/1975 | Izumi et al. | 318/678 |
| 3,978,387 | 8/1976 | Nettles | 318/678 |

*Primary Examiner*—B. Dobeck
*Attorney, Agent, or Firm*—T. L. Peterson; A. D. Stolzy

[57] ABSTRACT

This invention relates to a circuit arrangement and the associated mechanism for slaving the angles of rotation of the slats of a plurality of centrally controlled sun or window blinds. The driving motor of each blind is provided with current via a corresponding operational amplifier and related circuit. The motor operates the slats to achieve balance between an input control voltage and a voltage depending on the angular position of the slats. An automatic version in which the control voltage is generated by a photoelectric sensor and several circuit variations are shown.

2 Claims, 13 Drawing Figures

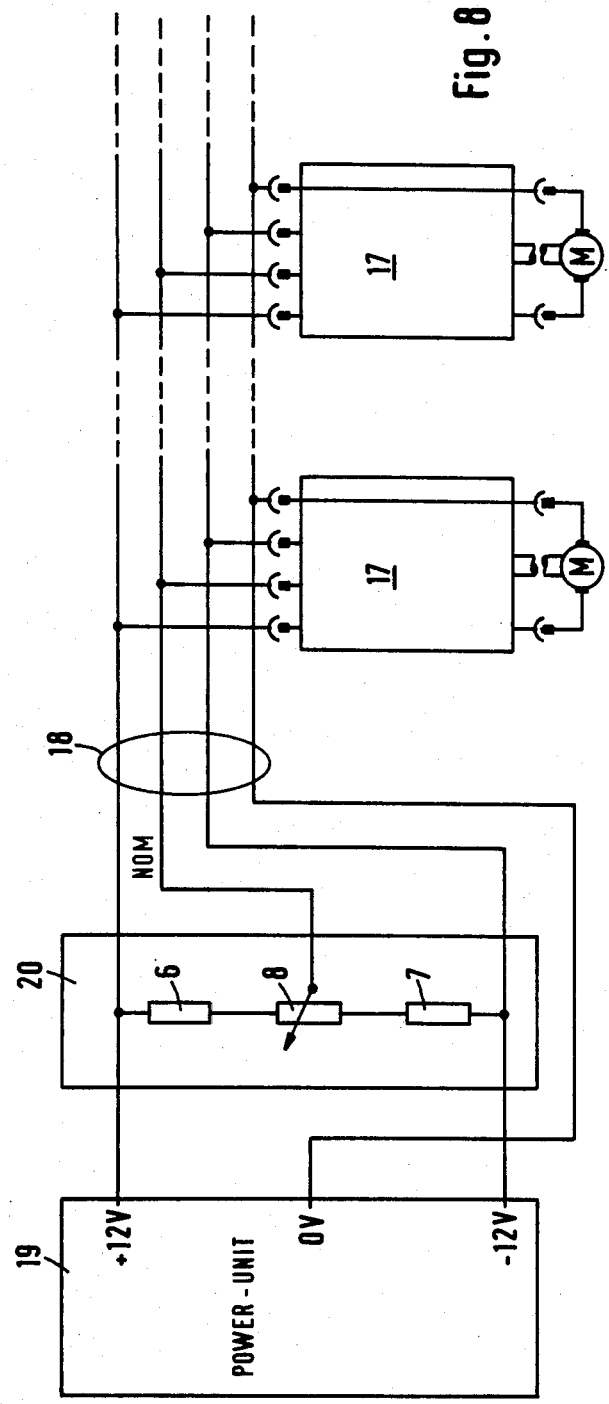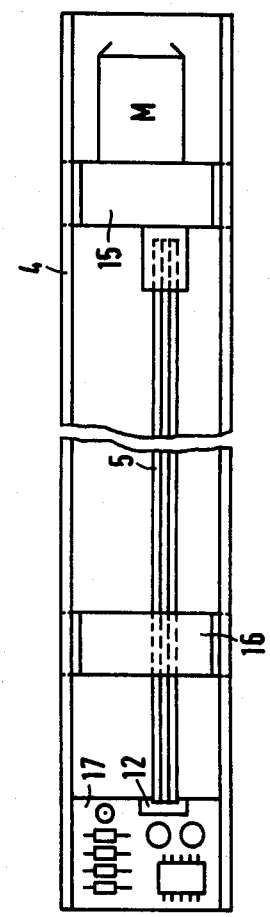

APPARATUS FOR SYNCHRONIZING THE SLATS OF MOTOR DRIVEN WINDOW BLINDS

BACKGROUND OF THE INVENTION

1. Field of the Invention

The invention relates to an arrangement for synchronizing the angle of rotation of the slats (also known as louvers) of a plurality of sun or window blinds which are simultaneously driven by electric motors, with which the turning or tilting of the salts is effected by means of a shaft arranged in a headrail and driven by an electric motor.

2. Description of the Prior Art

In very large buildings, a large number of sun or window blinds may be required, these blinds being provided with electric motor drives which are designed and constructed in such a way that the opening and the closing of the blinds, as well as the tilting and/or swivelling of the slats, is carried out either by the same motor or by separate motors. Such large window blind systems commonly have a central control by which, from a central point such as the building superintendent's station, all window blinds or the window blinds of one facade can be adjusted or readjusted simultaneously either manually or by means of an electric control device.

The central control must be capable of controlling the shielding effect of all sun or window blinds simultaneously and to the same extent, so that the slats of all blinds assume the same angular position in relation to the corresponding window planes. Formerly, however, this has not been possible, so that owing to the unavoidable slight differences in the blinds themselves, in the driving motors, slat-driving shafts, and bearings, etc., the angular positions of the individual blinds will usually differ from one another despite equal control stimulus. This not only causes a poor aesthetic total impression, but also has technical disadvantages, because the blinds do not produce the desired overall shielding effect.

SUMMARY OF THE INVENTION

It may be said to be the general object of the invention, therefore, to provide an arrangement by which the slats of all blinds track, i.e., always assume the same angular position under central control.

According to the invention, this object is achieved in that the electric motor performing the turning (tilting) of the slats receives its operating current from the output of an operational amplifier having a positive and a negative input, with the one input voltage thereof being taken from the wiper (slider) of a nominal potentiometer arranged between the positive and the negative supply voltage of the operational amplifier, and with the other input voltage being taken from the wiper (slider) of an actual-value potentiometer coupled to the shaft of the electric motor. The direction of said operating current is reversed when called for by the amplifier input voltage relative polarities.

Advantageous variations of the invention are set forth in the dependent claims. The invention will now be explained in greater detail with reference to FIGS. 1 through 13 of the accompanying drawings.

BRIEF DESCRIPTION OF THE DRAWINGS

FIG. 8, by way of a block diagram, shows the configuration of a central control for controlling a plurality of sun or window blinds, according to the invention.

FIG. 11 shows a headrail with an alternative arrangement of the sun or window blind driving system, according to the invention.

DETAILED DESCRIPTION

Figure 1:
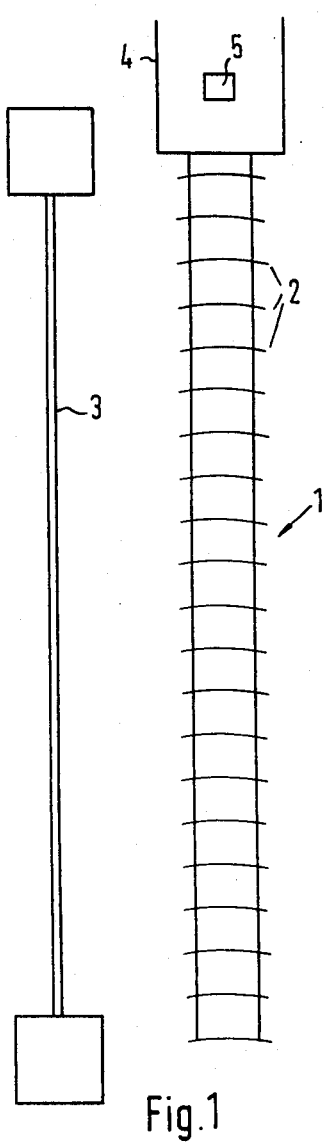
FIG. 1, in a side view, shows a window provided with a typical horizontal-slat blind.

FIG. 1 schematically shows a horizontal blind 1, i.e., a sun or window blind whose slats 2 are arranged horizontally in front of the window 3 and which is moved vertically or rotated in a vertical plane for effecting the opening and closing. Instead of being applied to a horizontal blind, the invention can be equally well applied to a vertical blind, i.e., a blind whose slats are arranged vertically, and which are moved horizontally or rotated in a horizontal plane for the closing and opening. The opening and the closing operation in the case of the horizontal blind as shown in FIG. 1 is to be carried out with the aid of a conventional electric motor (not shown) which is arranged in a headrail 4. The turning of the slats 2 is effected by turning the shaft 5 which is driven either by the same or by another electric motor.

Figure 2:
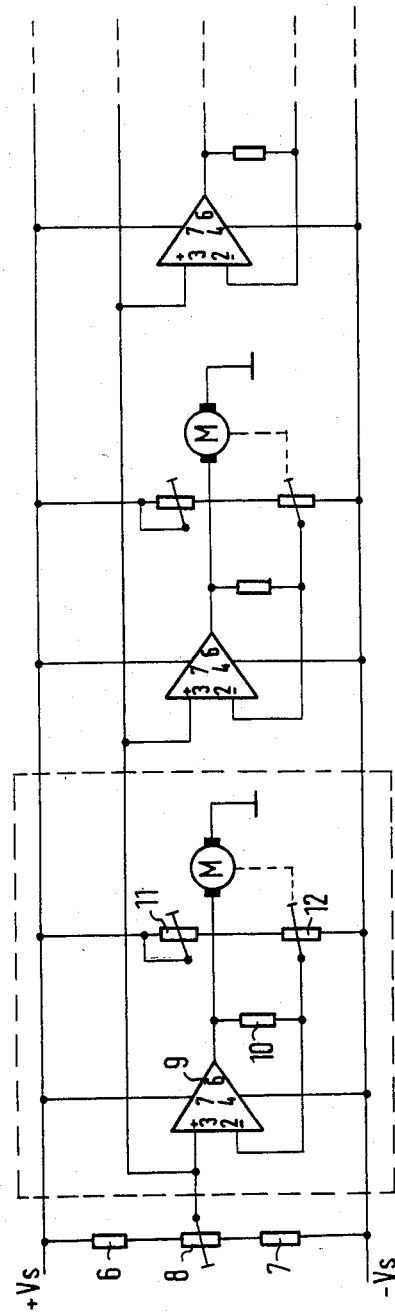
FIG. 2 shows a circuit arrangement for controlling the apparatus according to the invention.

FIG. 2 shows a circuit arrangement with which the desired uniform central control of a plurality of blind driving systems can be effected in such a way that the slats of all blinds connected to this central control assume the same angular position.

In FIG. 2, the motors which effect the turning of the slats 2 are indicated by the letter M. As can be seen from FIG. 2, the control signal source consists, on one hand, of the two resistors 6 and 7 and of one nominal-value potentiometer 8 effective for all three circuits of FIG. 2. On the other hand, each motor, and each corresponding sun or window blind control circuit, is provided with at least one operational amplifier 9, a resistor 10, a trimming potentiometer 11 and an actual-value potentiometer 12. All of the components belonging to one blind are arranged in a box indicated by the dashline in FIG. 2. In this arrangement, the driven (geared-down) shaft of the motor M is mechanically coupled to the wiper or slider of the actual-value potentiometer 12. By means of the trimming potentiometer 11, there are compensated the differences between the actual-value potentiometers 12 of several blinds. Since the operational amplifier is to supply the current for the motor M, it is possible to employ in place of a single operational amplifier 9, a series arrangement of two operational amplifiers. In a typical example of the invention, there was used a series arrangement consisting of an operational amplifier TBA 221 (Siemens) driving a power amplifier TDA 1420 (SGS-ATES).

The circuit arrangement as shown in FIG. 2 operates as follows: Depending on the desired angular position of the slats 2, there the wiper or slider of the nominal-value potentiometer 8 is correspondingly adjusted by a person operating the blinds. Accordingly, a voltage appears between the terminals 2 and 3 of the operational amplifier, so that a current is caused to flow through the motor M. The motors M, in turn, readjust the wipers of the actual-value potentiometers 12 which are mechanically coupled thereto, until the voltage between the terminals 2 and 3 of the operational amplifiers 9 becomes zero.

The slats 2 of all of the blinds as readjusted by the motors M, therefore, upon completion of the readjusting process, all assume the same angular position because the voltage at the terminals 2 and 3 of the operational amplifier 9 individually associated with one blind assumes the value zero when the motor M and, consequently, the wiper of the actual-value potentiometer 12 of this blind have reached the corresponding angular position.

Figure 3:
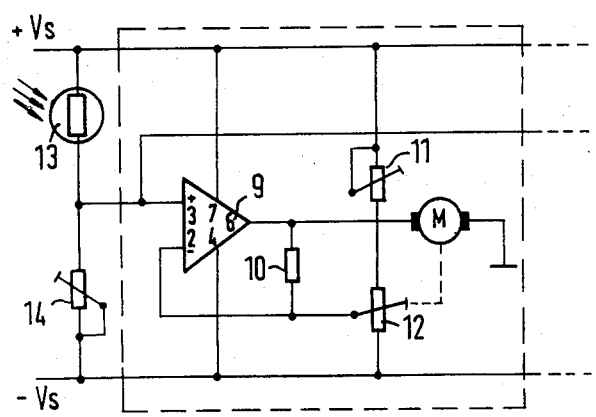
FIG. 3 shows a modification of the circuit arrangement as shown in FIG. 2.

FIG. 3 shows a modified version of the circuit arrangement according to FIG. 2 which automatically adjusts blinds as a function of detected light level. In this type of embodiment, the voltage as applied to the terminal 3 of the operational amplifier 9 is produced with the aid of the series arrangement consisting of the light sensor 13 and trimmer potentiometer 14 between the positive supply voltage +Vs and the negative supply voltage −Vs. This light sensor 13 contains a conventional photovoltaic cell through which a current flows which changes with the intensity of the incoming light. Therefore, when the incoming light intensity changes, there is also effected a change of the nominal voltage at the terminal 3 of the operational amplifier 9, so that a readjustment of the slats 2 is initiated.

Figure 4:
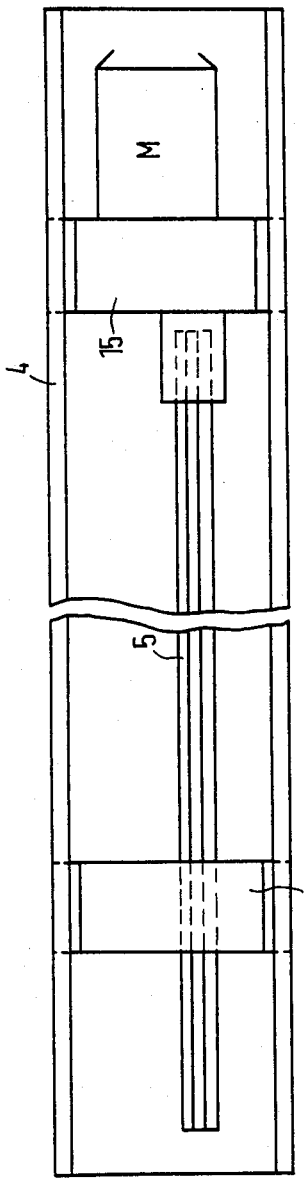
FIG. 4 shows a headrail with window-blind drive.

FIG. 4 illustrates how, in practice, and in the case of a horizontal-slat blind, the driving system at least for the turning of the slats, is arranged in the headrail 4. Within the headrail there is arranged the motor M which, if so required, may be supported together with a reduction gear, in the holder 15, and with the output torque thereof being transferred to the shaft 5. The apparatus according to FIG. 2, as associated with each blind, is accommodated in the corresponding holder 16.

Figure 5:
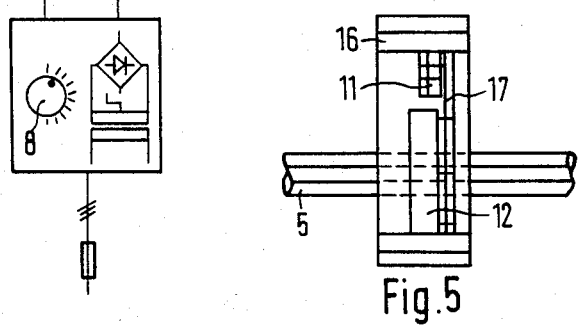
FIG. 5 shows a typical position for a circuit board as a part of the apparatus.
Figure 6:
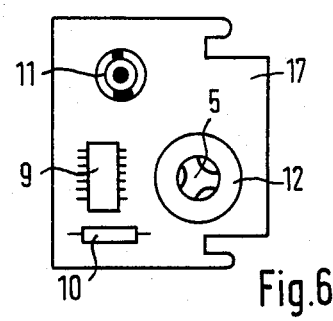
FIG. 6 is a side view of the circuit board of FIG. 5.

This is shown in more detail in FIGS. 5 and 6. In the holder 16 there is mounted the circuit board 17 on which the electronic components are arranged which are required for controlling the motor M, and which are interconnected with the aid of printed conductor leads.

From FIG. 6 it is recognizable how, for example, the resistor 10, the operational amplifier 9, the trimmer potentiometer 11 and the actual-value potentiometer 12 may be arranged on the printed circuit board 17. The actual-value potentiometer 12 is designed in such a way and arranged at such a point on the circuit board, that the shaft 5 extends through the actual-value potentiometer 12. In this way, the actual-value potentiometer, by excluding the tolerances of coupling components, for example, of the motor M, is mechanically coupled as tightly as possible to the slats.

Figure 7:
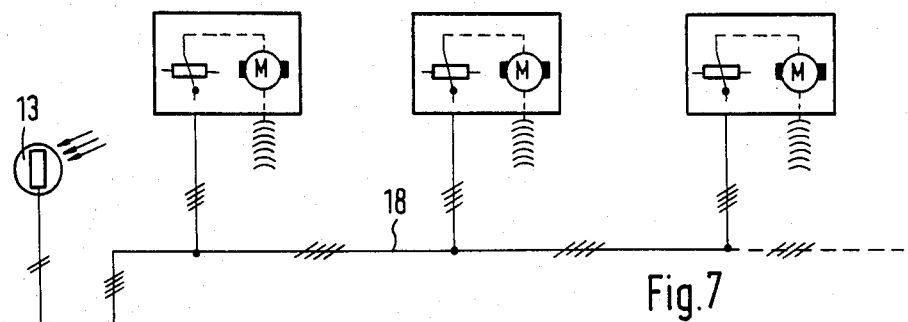
FIG. 7 shows the central control in a schematic representation.

FIG. 7 illustrates how, by employing the arrangement according to the invention, a plurality of blinds can be centrally controlled for the purpose of synchronizing the angular positions of the slats. In particular, it is worth mentioning that the arrangement according to the invention also permits simple wiring of the central control, because merely one ring line 18 consisting of four insulated wires is required to extend to each of the blind assemblies.

FIG. 8 shows a central control arrangement for controlling a plurality of motors M which perform the angular readjustment of the slats of the blinds. In FIG. 8 only two of the plurality of motors M are shown although it will be understood that substantially any number of blind motor and circuit modules may be employed and centrally controlled.

In the circuit arrangement of FIG. 8, the central control arrangement contains a power supply unit 19 which has one terminal each for +12 volts, −12 volts and 0 volt. The arrangement 20 for producing the nominal voltage NOM, and which consists of the resistors 6 and 7 as well as of the nominal-value potentiometer 8, corresponds to that shown in FIG. 2. The ring line 18 which has four wires is led to all motors M and their individual electronic control circuits 17.

Figure 9:
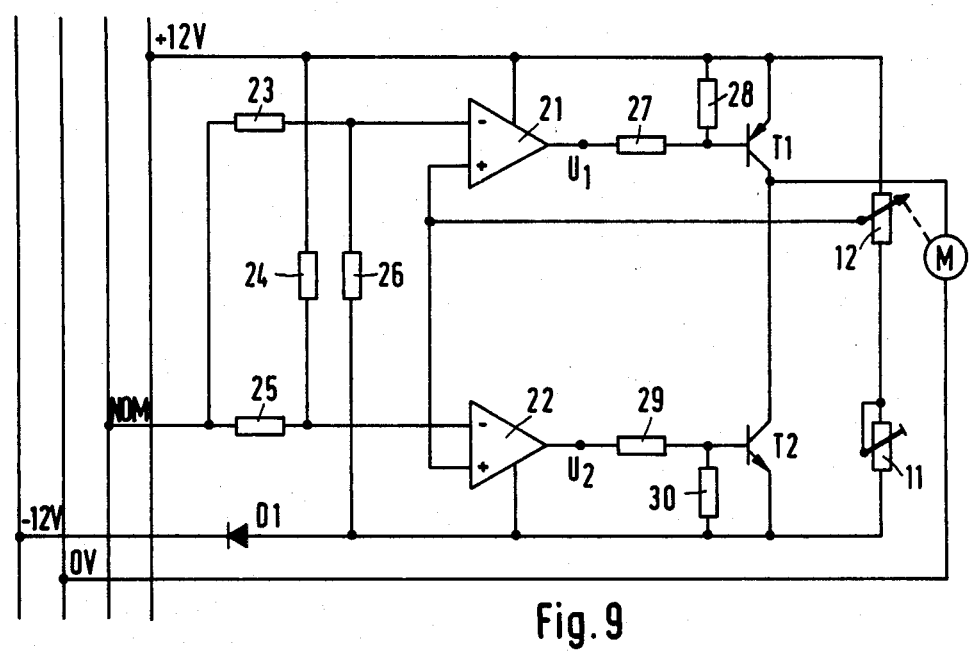
FIG. 9 shows one type of electronic control arrangement of a motor for readjusting the angular positions of the slats of sun or window blinds, according to the invention.

The construction of an electronic control circuit 17 for the four-wire ring line 18 of FIG. 8 can be seen from FIG. 9. In FIG. 9, the electronic control circuit consists of the operational amplifiers 21 and 22, the pnp transistor T1, the npn transistor T2, the actual-value potentiometer 12, the trimmer potentiometer 11, the diode D1 and the resistors 23 through 30.

As can be seen from that circuit arrangement, the nominal voltage NOM is applied across the resistors 23 or 25 to the negative terminals of the operational amplifiers 21 or 22, respectively. Resistors 24 and 26 cause the nominal voltage NOM to be decreased at the operational amplifier 21 while being increased at the operational amplifier 22. This measure causes (in the case of the slightest deviation of the input voltage UE from zero) an output voltage UA depicted in the diagrams in FIG. 12 in cases where the input voltage UE exceeds zero. UE is the voltage resulting from the difference between the nominal voltage NOM and the actual value as taken from the actual-value potentiometer 12. The diagrams in FIG. 12 show the output voltages UA of the operational amplifiers 21 and 22 as functions of the input voltage UE, with the output voltage U1 of the operational amplifier 21 being shown by a solid line, and the output voltage U2 of the operational amplifier 22 being shown by a dashline.

Figure 12:
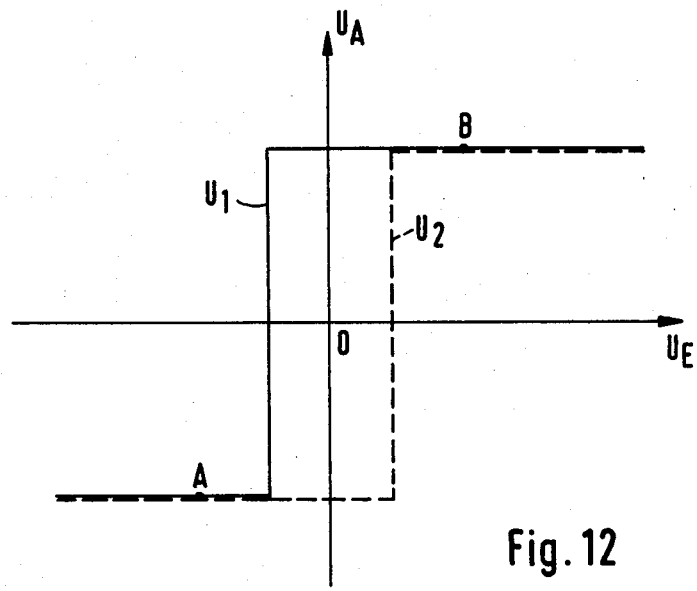
FIG. 12 graphically illustrates the output voltages U1 and U2 as functions of the input voltage UE in a circuit according to FIG. 9.

From this, there results the following mode of operation of the electronic control circuit according to FIG. 9:

When UE, due to the position of the nominal-value potentiometer 8, has a value corresponding to the point A in FIG. 12, then U1 and U2 have a certain indicated negative value. Accordingly, the base of T2 receives a voltage by which it is rendered non-conductive, and the base of T1 receives a voltage by which it is rendered conductive. Accordingly, the motor M is connected via T1 to +12 V and starts to run.

As a result of this, the motor displaces the actual-value potentiometer 12 in such a way that UE becomes more positive. When UE has reached a value at which U1 becomes positive, then also the transistor T1 is switched to the non-conducting state and the motor stops in this quiescent (balanced) condition.

If, however, the nominal-value potentiometer 8 is readjusted in such a way that an input voltage UE is produced which corresponds to point B in FIG. 12, then U1 and U2 have a defined positive value. The base electrode of T1 now receives a voltage by which it is rendered non-conductive, and the base electrode of T2 receives a voltage by which it is rendered conductive. Accordingly, the motor M is thus connected, via the transistor T2, to −12 V and starts to run in the opposite rotational sense than heretobefore. Accordingly, the motor readjusts the actual-value potentiometer 12 in such a way that UE becomes more negative. As soon as UE has reached a value at which U2 becomes negative, transistor T2 is switched to the non-conducting state, and the motor again comes to a stop.

In cases where the central control arrangement is composed of the electronic control circuits as shown in FIG. 9, the entire system is cost-effective since the motors and electronic control circuits are relatively inexpensive. For the ring line 18, of course, there is required a four-wire cable which is only slightly more expensive than a three-wire cable.

The central control arrangement, however, may be built up with a three-wire cable, but in this case different electronic control circuits are required.

Figure 10:
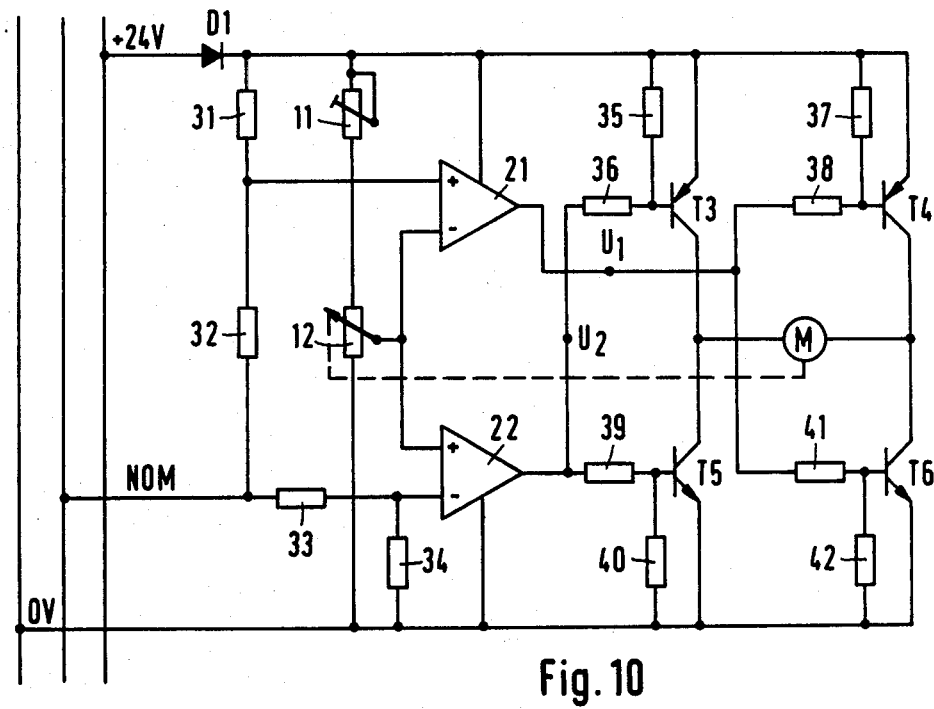
FIG. 10 shows a modified circuit for the electronic motor control for adjusting or readjusting the angular positions of the slats of sun or window blinds, according to the invention.
Figure 13:
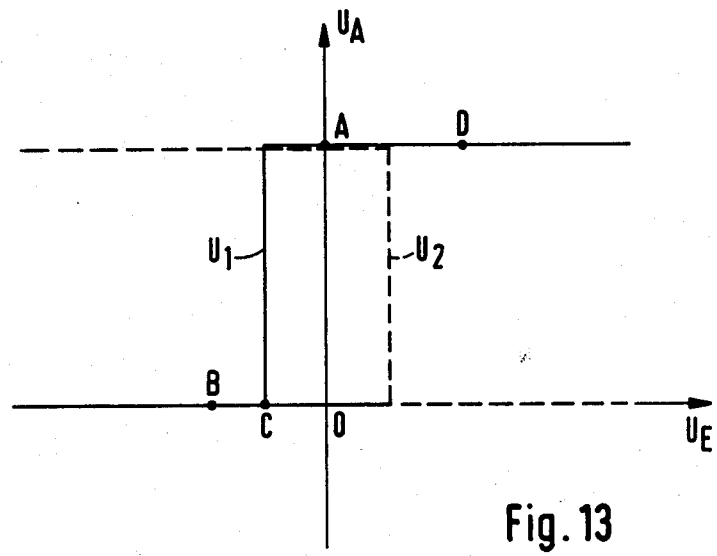
FIG. 13 graphically illustrates the output voltages U1 and U2 as functions of the input voltage UE in a circuit according to FIG. 10.

The circuit arrangement suitable for use with such an electronic control circuit is shown in FIG. 10. It comprises the operational amplifiers 21 and 22, the pnp transistors T3 and T4, the pnp transistors T5 and T6, the actual-value potentiometer 12, the trimmer potentiometer 11, the diode D1 and the resistors 31 through 42. As can be seen from FIG. 10, the nominal voltage NOM is applied, across the resistors 32 to 33, to the negative (minus) terminals of the operational amplifiers 21 and 22. Owing to the resistors 31 and 34, the nominal voltage NOM at the operational amplifiers 21 is increased while being decreased at the operational amplifier 22. This measure prevents every slight deviation of the input voltage UE from zero from generating an output voltage at the operational amplifiers 21 and 22 but, as can be seen from the diagrams in FIG. 13, the output voltage is only available in cases where the input voltage exceeds a defined, predetermined value differing from zero. Here, too, that voltage (UE) results from the difference between the nominal voltage NOM and the actual voltage as taken off the wiper of the actual-value potentiometer 12. The diagrams in FIG. 13 show the output voltages UA of the operational amplifiers 21 and 22 as functions of the input voltage UE, with the output voltage U1 of the operational amplifier 21 being indicated by a solid line, and the output voltage U2 of the operational amplifier 22 by a dashline. From this there results the following mode of operation of the electronic control circuit according to FIG. 10:

When the input voltage UE has a value of zero volt which corresponds to point A in FIG. 13, then U1 and U2 both have a defined positive value. Consequently, all four transistors (T3 throught T6) receive a positive base voltage.

The transistors T3 and T4 are rendered non-conductive while the transistors T5 and T6 are rendered conductive. The motor M is short-circuited against ground (0 volt-line) and, accordingly, receives no operating voltage.

When the nominal-value potentiometer 8, however, is readjusted in such a way that UE assumes a value which corresponds to point B in FIG. 13, then U1 is approximately zero, and U2 assumes a positive value. On account of this, T3 and T6 are rendered non-conductive while T4 and T5 are rendered conductive. Via the transistors T4 and T5, the motor is effectively connected between +24 V and 0 V, respectively. The motor thus starts to run and displaces the actual-value potentiometer 12 in such a way that UE becomes more positive. As soon as UE has reached a value at which U1 also becomes positive again (point C in FIG. 13) the transistor T4 is rendered non-conductive and the transistor T6 is rendered conductive, and the motor is braked.

The electronic control circuit as shown in FIG. 10 operates in a corresponding manner when the nominal-value potentiometer 8 is readjusted in such a way that UE assumes a value which corresponds to point D in FIG. 13. The electronic control circuit as shown in FIG. 10 is somewhat more expensive than the circuit as shown in FIG. 9; however, a central control arrangement constructed with the aid of this only requires a three-wire cable. This trade-off may be advantageous in some installations.

FIG. 11 shows a modification of the arrangement as shown in FIG. 4. In the variation shown in FIG. 11, the printed circuit board including the control circuit 17 is horizontally inserted into the headrail 4, and the actual-value potentiometer 12 is coupled to that particular end of the shaft 5 which is opposite the motor M.

Other variations and modifications will suggest themselves to those of skill in this art, once the invention is understood. Accordingly, it is not intended that the invention be considered limited by the specific illustrative drawings provided, or by this description.

What is claimed is:

1. In a follow-up system for positioning the louvers of a venetian blind or the like, said system comprising: positive, negative, zero and nominal input leads; variable means for producing an input voltage on said nominal input lead to control the position of the louvers; first and second differential amplifiers each having a plus input, a minus input, and an output; first and second resistors connected from said nominal input lead to the minus inputs of said first and second amplifiers, respectively; a third resistor connected from the minus input of said first amplifier to said positive input lead; a fourth resistor connected from the minus input of said second amplifier to said negative input lead; first and second transistors; said first transistor having an emitter connected to said negative input lead; said first and second transistors each having a base and a collector; said second transistor having an emitter connected to said positive input lead; a collector connected to that of said first transistor; said transistors being of opposite conductivity types; a fifth resistor connected from said first amplifier output to said first transistor base; a sixth resistor connected from said second amplifier output to said second transistor base; a seventh resistor connected from said first transistor base to said negative input lead; an eighth resistor connected from said second transistor base to said positive input lead; a motor having a drive shaft to tilt the louvers; said motor being connected from said transistor collectors to said zero input lead; and feedback means connected between said positive and negative input leads; said feedback means including a potentiometer having a winding and a wiper movable in contact with said winding in response to rotation of said drive shaft; said wiper being connected to said amplifier plus inputs.

2. In a follow-up system for positioning the louvers of a venetian blind or the like, said system comprising: positive, zero and nominal input leads; variable means for producing an input voltage on said nominal input lead to control the position of the louvers; first and second differential amplifiers each having a plus input, a minus input and an output; a first resistor connected from said nominal input lead to said first amplifier minus input; a second resistor connected from said nominal input lead to said second amplifier plus input; a third resistor connected from said first amplifier minus input to said zero input lead; a fourth resistor connected from said second amplifier plus input to said positive input lead; said first amplifier plus input and said second amplifier minus input being connected together at a first junction; first, second, third and fourth transistors each having a collector, an emitter and a base, fifth and sixth resistors connected from said first amplifier output to said first and second transistor bases, respectively; a seventh resistor connected from said first transistor base to said zero input lead; an eighth resistor connected from said second transistor base to said positive input lead; said first and second transistor emitters being connected to said positive and zero input leads, respectively; said first and second transistor collectors being connected together at a second junction; ninth and tenth resistors connected from said second amplifier output to said third and fourth transistor bases, respectively; an eleventh resistor connected from said third transistor base to said zero input lead; a twelfth resistor connected from said fourth transistor base to said positive input lead; said third and fourth transistor emitters being connected to said positive and zero input leads, respectively; third and fourth transistor collectors being connected together at a third junction; a motor having an output shaft; said motor being connected between said second and third junctions; and feedback means connected between said positive and zero input leads; said feedback means including a potentiometer having a winding and a wiper movable in contact with said winding in response to rotation of said drive shaft; said wiper being connected to said first junction.

* * * * *